United States Patent Office 3,178,395
Patented Apr. 13, 1965

3,178,395
METHOD FOR POLYMERIZING VINYL MONOMERS AND MALEIC ANHYDRIDE
Irving E. Muskat, Miami, Fla., assignor, by mesne assignments, to Sinclair Research, Inc., a corporation of Delaware
No Drawing. Filed Oct. 30, 1959, Ser. No. 849,704
8 Claims. (Cl. 260—78.5)

The present invention relates to methods for the rapid and safe polymerization of olefinically unsaturated compounds, preferably vinyl unsaturated compounds with maleic anhydride or halogen-substituted maleic anhydride under conditions which would normally be viewed as potentially or probably dangerous because of the likelihood of explosion.

The invention is particularly directed to solution polymerization in the presence of a free-radical generating catalyst to produce a copolymer which, due to the presence of maleic anhydride or halogen-substituted maleic anhydride as one of the monomer reactants, provides a polymer which is essentially insoluble in the polymerization solution and in which the polymerization reaction is exothermic, the rapidity of the reaction increasing with increasing reaction temperature so that the reaction inherently tends to run-away and produce an explosive reaction. These dangerous reaction conditions are particularly evident in the copolymerization of maleic anhydride with styrene but the invention is not restricted to the use of styrene and other vinyl unsaturated compounds such as, for example, vinyl toluene, acrylates such as ethyl acrylate, methacrylates such as methyl methacrylate, acrylonitrile, vinyl ethers such as methyl vinyl ether as well as other olefinically unsaturated compounds such as ethylene, propylene, butene-1, butene-2 and diallyl phthalate enter into polymerization reactions with maleic anhydride or halogen-substituted maleic anhydride in the same manner, e.g., a solution polymerization reaction in which the polymer precipitates from the solution and in which the polymerization reaction is exothermic and the reaction increases in rapidity with increasing reaction temperature. For some vinyl monomers a closed system or pressure may be required to maintain all of the reacting components together in the liquid phase, these monomers being illustrated by ethylene, propylene and vinyl chloride.

The invention is particularly directed to practical polymerization reactions in which, for purposes of economy in materials and yield per equipment investment, the monomers are supplied to the polymerization reaction with a minimum volume of carrying liquid, as for example, in a solvent solution containing at least about 5–10% and preferably about 20% or more by weight of dissolved monomers. If desired, the carrying liquid may contain suspended monomers or it may be eliminated entirely. In reactions of the type described, the higher the monomer concentration in the liquid medium supplied to the reaction, the greater is the danger of explosion. Moreover, in achieving rapid and high conversion, it is desirable to employ concentrations of catalyst in excess of about 2% by weight based on the weight of monomers and increasing catalyst concentration further increases the danger of explosion.

The practical difficulty encountered by the invention is particularly well illustrated by reference to the prior solution copolymerization of styrene with maleic anhydride in which the danger of explosive reaction has largely prevented successful commercial production. In prior batch processes, it is frequently necessary to introduce catalyst slowly to lessen the danger of explosive reaction, but slow catalyst addition in batch processing does not represent a feasible commercial process and it prevents the achievement of polymers possessing uniform desirable characteristics or greatly lowered molecular weight.

The control associated with continuous processing is of some assistance, but in the known continuous processes, unreacted monomers accumulate to concentrations in the range of 5–20% and the presence of large amounts of finely divided suspended copolymer makes cooling inefficient. Thus, continuous processing aggravates the danger of explosive reaction. Accordingly, the art has largely avoided the more rapid reactions associated with higher temperatures (particularly above 90° C.) or higher catalyst concentrations (above 1.5% and particularly above 2%) and lower temperatures and concentrations were not safely handled even at low rates of addition of monomer-containing solution, e.g., about 10% of a reactor volume per hour.

In the polymerization reactions under consideration, the copolymer is insoluble in the solution medium and precipitates in fine particles. In the prior art, elevated reaction temperature causes these polymer particles to fuse and agglomerate to form a taffy-like mass which prevents agitation or stirring. Accordingly, the art teaches that the reaction is to be conducted at temperatures below those causing fusion of monomer particles and this is particularly true in continuous or semi-continuous processing. Where fusion to form a taffy-like mass has been permitted, the reaction mass cannot be agitated and the process is largely unworkable.

In accordance with the incremental reaction procedure of the invention, catalyst and monomer reactants are simultaneously supplied to a reaction vessel containing a portion of the selected solvent at the reaction temperature and at a rate not substantially in excess of the rate of conversion of monomer to polymer. Accordingly, even if the reaction temperature becomes higher than desired, there can be no explosive reaction because there is not available a high concentration of unreacted monomers to feed the reaction.

The simultaneous supply of catalyst and monomer is preferably effected by addition of a solution containing catalyst and monomer reactants all dissolved in the selected solvent. However, if desired, the monomers can be dissolved in one portion of selected solvent and the catalyst dissolved in a second portion of selected solvent and both solutions supplied simultaneously to the reaction vessel containing selected solvent at reaction temperature. In this way, the monomer-containing solution is more stable and may be supplied at a temperature different from the temperature of the catalyst-containing solution, e.g., the catalyst-containing solution may be supplied at a low temperature where it is more stable and the monomer-containing solution may be supplied at a higher temperature where the selected solvent can tolerate a higher proportion of dissolved monomers. Indeed, in view of the fact that the monomer-containing solution in preferred practice of the incremental addition process is supplied to a large volume of vigorously agitated selected solvent containing a minimum proportion of unreacted monomers and maintained at very elevated temperatures, substantially instantaneous solution of monomers in the selected solvent within the reaction vessel becomes feasible and the monomer-containing solution may contain suspended monomers, particularly suspended maleic anhydride. Indeed, since maleic anhydride is quite soluble in styrene, the maleic anhydride may be dissolved in the styrene and supplied without predissolving of these monomers in the selected solvent. To insure uniform and substantially instantaneous admixture of catalyst in the reaction liquor and as a safety precaution, the catalyst, particularly if it is slow dissolving, is desirably first dissolved in a portion of the selected solvent. Of course, as stated above, the catalyst may be dissolved in the reactive ingredients or added separately but simultaneously to the reaction vessel.

The above relatively simple underlying feature has yielded striking new results and converted unsafe and unsuccessful processes into commercially outstanding contributions.

A feature of the invention is the rapid, safe and effective copolymerization of monomers under conditions which, if attempted on a batch basis without slow addition of catalyst, would almost certainly result in explosive reaction. Thus, combinations of reaction temperature, monomer concentration and catalyst concentration formerly producing explosive reactions are advantageously employed in accordance with the invention. Slower reaction conditions may also be used and the avoidance of monomer accumulation again leads to more uniform copolymer products and to safer reactions, particularly if the invention is carried out on a semi-continuous or fully continuous basis. In its preferred form, the invention provides a copolymerization process yielding substantially instantaneous and complete conversion of monomer to polymer, characteristics unique to inorganic solution reactions.

The invention is particularly valuable as a means of producing copolymers of very low molecular weight as a result of the high temperatures and catalyst concentrations which are permitted, as for example, low molecular weight copolymers of maleic anhydride and styrene using specific solvents such as cumene and cymene having chain terminating activity. However, the present invention is not limited to low molecular weight nor is it limited to the use of chain terminating solvents. To the contrary, the invention permits the lowering of molecular weight using solvents having only limited chain terminating activity as well as the efficient production of copolymers of relatively high molecular weight. The invention, because it permits operation at constant temperature, enables the production of copolymer products of remarkably uniform molecular weight, irrespective of high or low molecular weight.

In accordance with preferred practice of the invention, incremental addition of solutions containing dissolved monomers and free-radical generating catalyst to a portion of solvent or previously reacted solution is effected with the portion of solvent or previously reacted solution maintained at more elevated temperature than is safe if applied directly to the monomer-containing solution. Also, the concentration of catalyst in the added solution is desirably increased to cause the reaction to proceed with the greatest possible rapidity and is preferably in the range of from 2–5% by weight of benzoyl peroxide or corresponding equivalent proportion of other free-radical generating catalyst based on total monomers. The rate of addition of monomers in the invention is regulated so that it does not substantially exceed the rate of conversion of monomer to copolymer. In this way, the concentration of unreacted monomers in the reaction vessel is maintained at extremely low levels, e.g., preferably very much less than 1% by weight based on the reaction liquid, although up to about 3% by weight of unreacted monomers is less desirably tolerated. At the more elevated reaction temperature and particularly in the presence of a high but uniformly distributed proportion of catalyst, polymerization is very rapid and, at the higher temperatures permitted by the invention, is substantially instantaneous. A reaction rate producing a 95% conversion within 1–2 minutes represents a preferred lower limit of reaction rate.

It is desired to point out that by proceeding incrementally at elevated reaction temperature and in the presence of a high concentration of catalyst, the polymerization reaction is effected at high speed with substantially complete conversions of monomer to copolymer. Surprisingly, the danger of explosion is completely avoided. Interestingly, a dangerous and explosive reaction is safely conducted by proceeding properly while using high reaction temperatures and high concentrations of catalyst leading to much faster reactions than are usual in procedures fraught with danger. This is a most unique and important achievement. Irrespective of whether the polymerization reaction is fast or slow, regulation of the rate of addition of monomer-containing solution prevents accumulation of unreacted monomers and provides safety in commercial operation.

The incremental addition procedure is desirably effected utilizing a solvent such as p-cymene which boils at a temperature sufficiently high to cause the copolymer particles to precipitate in a fluid molten condition. In this way, minimum molecular weight is achieved, the reaction is carried out with extreme rapidity, monomer-containing liquid mediums of high concentration are safely supplied to the polymerization reaction (conveniently 20%), the fluid molten condition of the copolymer permits the necessary vigorous mechanical agitation, and the addition of monomer-containing solution with the resultant exothermic heat of polymerization supplies the heat required to maintain the boiling condition. Moreover, high rates of addition of the monomer-containing solution may be used since the excess heat generated is carried away by the boiling solvent and any cooling desired may be performed in an external reflux condenser. Despite the rapidity of copolymer production, substantially complete conversions of monomers to copolymer may be obtained. This is indeed unusual in polymer processes. Still further, polymerization reactions in which the copolymer precipitates are conventionally limited to temperatures below the fusion point and these temperatures are desirably substantially exceeded in the invention.

In contrast with the prior art, the utilization of reaction temperatures in excess of 90° C., preferably above 100° C., coupled with the use of catalyst concentrations in the range of 2–5% by weight based on monomers, enables a rate of monomer-containing solution addition which permits the volume of a given reactor to be replaced in less than 3 hours whether operating on a batch or continuous basis. Using preferred conditions, the reactor volume can be replaced in less than 1 hour.

The molar ratio of olefinically unsaturated compound to maleic anhydride or halogen-substituted maleic anhydride which are reacted may vary considerably, e.g., in the range of 1:2 to 2:1. Usually a copolymer is produced in which the molar ratio of monomers is substantially 1:1, and, in many instances and ignoring solvent termination, it is reasonable to conclude that the copolymer is a heteropolymer. Preferably, the molar ratio of olefinically unsaturated compound to maleic anhydride or halogen-substituted maleic anhydride is substantially 1:1 although a molar excess of up to about 5% of olefinically unsaturated compound is, at times, desirably present. The copolymer product, particularly when it is of extremely low molecular weight, may contain up to about 12% of combined solvent terminating agent.

The process of the invention is desirably carried out by first producing a solvent solution containing dissolved olefinically unsaturated compound and maleic anhydride or halogen-substituted maleic anhydride and peroxide polymerization catalyst in which the monomers are substantially unreacted. Thus, a 20% solution of monomers may be provided by mixing maleic anhydride with the selected solvent and warming with agitation to a temperature of 50–55° C. until the maleic anhydride is dissolved. The solution so obtained is then filtered, if necessary, and the olefinically unsaturated compound, e.g., styrene, is added with mixing to provide a homogeneous solution containing a substantially 1:1 ratio of monomers. A peroxide catalyst such as benzoyl peroxide is then simply stirred into the solution to dissolve the same easily. These solutions, when maintained at a temperature of 45–50° C., are stable and the monomer reactants remain in solution without polymerizing for a reasonable time, sufficient to permit commercial operation.

While polymerization generally occurs at temperatures above about 75° C. (using the common free-radical generating catalyst benzoyl peroxide or other peroxide of similar activity), it will be understood that the minimum temperature of polymerization as well as the preferred temperature of polymerization will vary with the specific catalyst selected. Thus, catalysts such as 1-hydroxy cycohexyl hydrogen peroxide or the use of peroxides with accelerators such as cobalt salts, e.g., cobalt nuodate, or amines, e.g., dimethyl aniline, permit the use of lower polymerization temperature. Similarly, catalysts such as acetone peroxide which provide free radical reactivity and stability at higher temperatures enable higher reaction temperatures to be more effectively used but the minimum reaction temperature is elevated. The preferred solvents in the invention may be oxidized under controlled conditions to form peroxides or other free-radicals in situ and such peroxides may in part or in whole replace the peroxides normally used.

Various other organic peroxides such as dilauryl peroxide, di-tertiary butyl peroxide, diacetyl peroxide, acetyl benzoyl peroxide, tertitary butyl hydroperoxide, cumene hydroperoxide, etc., may be used as well as other free-radical generating catalysts such as azo compounds illustrated by azodiisobutyronitrile.

The proportion of catalyst will also vary with the catalyst which is selected and the reaction temperature of from about 60–200° C. which is employed. Broadly, the catalyst may be used in an amount of from 0.05–5.0% and even higher concentrations up to about 10% by weight of benzoyl peroxide or corresponding equivalent proportion of other free-radical generating catalyst based on total monomers may be used. As previously indicated, in the incremental procedure of the invention, safety, speed of reaction, rate of monomer addition and lowered molecular weight are all favored by higher catalyst concentration in excess of 2%.

The organic solvent employed in accordance with the invention should be capable of dissolving, under the conditions of reaction, the olefinically unsaturated compound and maleic anhydride monomer components and incapable of dissolving the polymeric product which is produced in appreciable quantities. Moreover, the organic solvent should be free of such unsaturation enabling copolymerization with the vinyl unsaturated compound or maleic anhydride and substituents reactive with the olefinically unsaturated compound or maleic anhydride monomers under the conditions of polymerization. Thus, conventional hydrocarbons and chlorinated hydrocarbons well known for use in the polymerizations under consideration may be used, these normally being termed "inert." Also solvents such as cumene or the various cymenes having strong chain-terminating activity may also be used. Solvent selection is thus important to molecular weight as well as to many other factors such as catalyst selection, temperature of reaction, cost factors, etc. However, solvent selection aside from the factors of insolubility of the polymer product therein and the capacity to use higher reaction temperatures is not an essential feature of the invention.

Solvents having a boiling point above the melting point of the copolymer product in the selected solvent are particularly advantageous to emphasize rapidity of reaction and low molecular weight thereby enabling reaction at atmospheric pressure under reflux conditions at maximum temperature.

Polymerization reaction temperatures causing fusion of precipitated particles and the production of a taffy-like mass should be avoided. Such undesired temperatures will vary with the solvent selected as well as with the type and purity of the olefinically unsaturated compound used. Using the substantially pure styrene available in large quantities in commence and selecting cumene as solvent, temperatures up to about 125° C. may be used without fusion. At higher temperatures up to the boiling point at 152° C., fusion and agglomeration to a taffy-like mass take place using cumene. With p-cymene, temperatures up to about 134° C. may be used without fusion. From 134–155° C. fusion takes place producing an undesired taffy-like mass. Above about 155° C., and particularly at the reflux temperature of 176° C., the copolymer product comes out of solution as a fluid molten mass which is easily stirred or agitated.

In conventional batch polymerization procedures, high conversions of monomers to copolymer usually require the continuation of the polymerization reaction after the exotherm has subsided. Thus, the use of heat to maintain, and preferably increase, reaction temperature for a period of 1 to 3 hours is preferred. In the incremental procedure, when using higher reaction temperatures and higher catalyst concentrations, conversions are much faster and the need to continue the polymerization reaction to achieve high conversions is substantially lessened. Indeed, at the higher reaction temperatures in excess of 150° C., the need to continue the polymerization reaction after the exotherm has subsided may be eliminated with substantially complete conversion of monomer to copolymers.

The incremental reaction procedure, particularly at the higher reaction temperatures, may be operated with sufficient rapidity such that the need for external heat is eliminated once the reaction has been initiated. If desired, however, the rate of addition of monomers may be slowed and external heat supplied to maintain the desired temperature or the rate of addition of monomers may be increased and external cooling employed to permit the desired temperature to be maintained. As will be obvious, this latter operation is particularly adapted to operation at reflux temperature.

Upon completion of the polymerization reaction, the polymer product which is insoluble in the selected solvent is easily removed from the reaction liquid as by mechanical separation (filtration).

The following examples are given by way of illustration and not by way of limitation. All parts and percentages are by weight.

EXAMPLE I

A kettle of 30 gallon capacity and provided with agitation equipment and a jacket adapted to provide heating or cooling was charged with approximately 7 gallons of cumene, and the kettle contents heated and maintained at a temperature of approximately 108° C.

In a separate tank approximately 17.6 pounds of maleic anhydride briquettes were dissolved in approximately 13 gallons of cumene. The maleic anhydride-cumene solution was heated to approximately 53° C. and upon disappearance of the briquettes the solution was filtered and approximately ¾ pound of insoluble maleic acid was recovered. Approximately 18.3 pounds of styrene monomer were added to the clear filtrate representing approximately 1% excess by weight over a 1:1 molar ratio of styrene to maleic anhydride. After stirring to produce a homogeneous solution and cooling to 48° C., 390 grams of benzoyl peroxide were added and dissolved by stirring to provide approximately 2.4% benzoyl peroxide by weight of total monomers present.

The resulting monomer-containing solution was metered into the 30 gallon reaction kettle at a rate of about 0.26 gallon per minute. There was substantially no induction period. After about 20–24 minutes of substantially continuous addition of monomer-containing solution, the "pot temperature" leveled off to a running temperature in the range of 115–120° C. The time for addition of approximately 15 gallons of monomer-containing solution was about 68 minutes. Heating and agitation of the reaction mixture were continued for an additional hour while maintaining the "pot temperature" between about 115° C. and 120° C. When the temperature of the reaction mixture had cooled to 100° C., the resultant heteropolymer product was drawn off, separated from residual solution by centrifuging and dried to provide 35.7 pounds of heteropolymer for a yield, based on monomer, of approximately 102%. By boiling point elevation procedure a molecular weight of 1680 was calculated for the product of this example.

EXAMPLE II

Example I was repeated using xylene instead of cumene as the solvent. Substantially identical results were obtained with the exception that the heteropolymer product possessed higher molecular weight as evidenced by higher solution viscosity in acetone.

EXAMPLE III

Example I was repeated using p-cymene as the solvent in place of cumene. The temperature of the initial p-cymene charge was 132° C. and the temperature was maintained at 132–134° C. during the entire time of monomer-containing solution addition which was added at the rate of 0.5 gallon per minute, the total time of addition being about 35 minutes. 36.0 pounds of heteropolymer were recovered having a yield, based on monomer, of 103%.

EXAMPLE IV

*(Molten mass)*

Example III was repeated with the exception that the initial charge of p-cymene was at substantially the boiling point (about 176° C.) and the reaction kettle was fitted with a reflux condenser so that p-cymene vapors could be condensed and returned to the reaction mixture. The monomer-containing solution was added at the rate of about 3 gallons per minute, 15 gallons of solution being added within about 5 minutes, while the liquid reaction mixture boiled within the kettle. The reaction was substantially instantaneous. Following the addition of 15 gallons of monomer-containing solution to the kettle, the molten mass of heteropolymer product which had formed within the kettle was allowed to settle to the bottom of the kettle where it was drawn off. Some of the molten product adhered to the walls and agitator and after cooling it was scraped off and added to the remainder of the product. This molten product was allowed to cool to form a solid mass which was air dried and then broken up to form a particulate heteropolymer product. The yield, based on monomer, was 111.5% indicative of complete reaction of styrene and maleic anhydride and also substantially complete termination of the heteropolymer by p-cymene. The residual liquid remaining in the kettle was suitable to either constitute the hot initial solvent medium in the kettle for a further batch (such procedure would normally be considered semi-continuous) or to be recycled for use in the preparation of fresh monomer-containing solution. In point of practice, part of the residual solvent liquid would be used to constitute hot initial charge while the remainder could be recycled to form fresh monomer-containing solution. By boiling point elevation procedure a molecular weight of 1238 was calculated for the product of this example.

The present application is related to my copending application Serial No. 849,706, filed October 30, 1959, now United States Patent No. 3,085,994, which is a continuation-in-part of my prior application Serial No. 637,890, filed February 4, 1957 (abandoned), specifically directed to the production of styrene-maleic anhydride copolymers and which application is now abandoned.

The invention is defined in the claims which follow.

I claim:

1. A method of preparing low molecular weight copolymers of an hydride monomer selected from the group consisting of maleic anhydride and halogen-containing maleic anhydride with olefinically unsaturated monomer copolymerizable therewith in solution in a liquid organic solvent, the polymerization reaction being exothermic with the rate of reaction increasing with increasing reaction temperature comprising simultaneously adding said anhydride monomer and said monomer copolymerizable therewith in a mol ratio of 2:1 to 1:2 and free-radical generating polymerization catalyst in a concentration providing at least 5% by weight of total monomers to a portion of an organic solvent for said monomers containing less than 3% by weight of reactable monomers maintained at a temperature above 90° C. which will cause an uncontrollable exothermic polymerization if directly applied to a mixture of the materials supplied to said organic solvent, said organic solvent being a non-solvent for said copolymers, and regulating the rate of addition of said monomers so that it does not substantially exceed the rate of conversion of monomer to copolymer.

2. A method as recited in claim 1 in which said organic solvent is maintained at a temperature at which the copolymer which is formed will precipitate in fluid molten condition.

3. A method as recited in claim 1 in which vinyl unsaturated monomer is reacted with maleic anhydride and said portion of organic solvent contains less than 1% by weight of reactable monomers.

4. A method as recited in claim 1 in which the concentration of monomers in the materials supplied to said portion of organic solvent is at least about 20% by weight, and said portion of organic solvent is maintained at a temperature above 100° C.

5. A method as recited in claim 3 in which said vinyl unsaturated monomer is styrene.

6. A method of preparing a low molecular weight chain terminated copolymer of styrene and maleic anhydride solid at room temperature, comprising simultaneously adding styrene and maleic anhydride monomers in a mol ratio of 2:1 to 1:2 and free-radical generating polymerization catalyst in a concentration providing at least 5% by weight of total monomers to a portion of an organic solvent containing less than 3% by weight of unreacted styrene and maleic anhydride maintained at a temperature above 90° C. which will cause an uncontrollable exothermic polymerization reaction if directly applied to a 5% solution of monomers containing said catalyst, said organic solvent being a non-solvent for said copolymer, and regulating the rate of addition of said monomers so that it does not substantially exceed the rate of conversion of monomer to copolymer.

7. The method of claim 6 further characterized in that said styrene and maleic anhydride are added to said portion of organic solvent in the form of a solution in the same organic solvent.

8. The process of claim 7 further characterized in that the polymerization is conducted at a temperature in excess of 100° C. and said organic solvent which is maintained at the polymerization temperature contains less than 1% by weight of unreacted styrene and maleic anhydride.

References Cited by the Examiner

UNITED STATES PATENTS

| | | | |
|---|---|---|---|
| 2,430,313 | 11/47 | Vana | 260—78.5 |
| 2,496,384 | 2/50 | De Nie. | |
| 2,675,370 | 4/54 | Barrett | 260—78.5 |
| 2,756,219 | 7/56 | Van der Plas et al. | 260—78.5 |
| 2,838,475 | 6/58 | Barrett | 260—78.5 |
| 2,913,437 | 11/59 | Johnson | 260—78.5 |

LEON J. BERCOVITZ, *Primary Examiner.*

H. N. BURSTEIN, J. R. LIBERMAN, *Examiners.*

Disclaimer 3,178,395.—*Irving E. Muskat*, Miami, Fla. METHOD FOR POLYMERIZING VINYL MONOMERS AND MALEIC ANHYDRIDE. Patent dated Apr. 13, 1965. Disclaimer filed Mar. 30, 1965, by the inventor; the assignee, *Sinclair Research, Inc.*, consenting.

Hereby enters this disclaimer to the terminal portion of said patent subsequent to April 16, 1980.

[*Official Gazette June 29, 1965.*]